United States Patent
Choksi et al.

(10) Patent No.: US 7,636,581 B1
(45) Date of Patent: Dec. 22, 2009

(54) INTER-NETWORK DISPATCH TALK GROUP CALLS

(75) Inventors: Ojas T. Choksi, Herndon, VA (US); Arun Manroa, Herndon, VA (US)

(73) Assignee: Nextel Communications, Inc., Reston, VA (US)

( * ) Notice: Subject to any disclaimer, the term of this patent is extended or adjusted under 35 U.S.C. 154(b) by 742 days.

(21) Appl. No.: 11/338,627

(22) Filed: Jan. 25, 2006

(51) Int. Cl.
*H04J 3/06* (2006.01)

(52) U.S. Cl. .................. 455/519; 455/418; 455/90.2

(58) Field of Classification Search ............ 455/90.2, 455/412.1, 414.1, 415, 517–520, 78, 79, 455/500, 426.1, 422.1, 416, 420; 370/352, 370/389, 338, 328
See application file for complete search history.

(56) References Cited

U.S. PATENT DOCUMENTS 6,519,239 B1* 2/2003 Panchal et al. .............. 370/335
2003/0012157 A1* 1/2003 Rozenstrauch et al. ...... 370/335
2005/0135386 A1* 6/2005 Shores et al. ................ 370/401
2006/0085545 A1* 4/2006 Borella et al. ............... 709/227
2007/0133517 A1* 6/2007 Miller et al. ................. 370/352

* cited by examiner

*Primary Examiner*—Duc Nguyen
*Assistant Examiner*—Dominic E Rego

(57) ABSTRACT

A system and method for predefined dispatch talk group calls are provided. A first and second dispatch communication network use different dispatch station identifiers. Dispatch station identifiers in the format of the first network are stored in the dispatch communication server of the first network, dispatch station identifiers of the second network are stored in a dispatch communication server of the second network, and a group server of the second network includes a mapping of the dispatch station identifiers between the two networks. Providing the mapping of dispatch station identifiers in the second network allows predefined dispatch group calls between communication stations of different dispatch communication networks without requiring any changes to the addressing used in one of the dispatch communication networks.

28 Claims, 6 Drawing Sheets

Talk Group Identifier_1
- MSID_1
- MSID_2
- MSID_3
- MSID_4
- MSID_5

FIGURE 3a

GroupID@Network_1.com
- msid_1@Network_1.com
- msid_2@Network_1.com
- msid_3@Network_1.com
- msid_4@Network_2.com
- msid_5@Network_2.com

FIGURE 3b

Talk Group Identifier_1=GroupID@Network_1.com
- MSID_1=msid_1@Network_1.com
- MSID_2=msid_2@Network_1.com
- MSID_3=msid_3@Network_1.com
- MSID_4=msid_4@Network_2.com
- MSID_5=msid_5@Network_2.com

FIGURE 3c

INTER-NETWORK DISPATCH TALK GROUP CALLS

BACKGROUND OF THE INVENTION

Cellular communications systems typically provide interconnect and/or dispatch voice communication services. Interconnect voice communication services are those typically provided by most cellular carriers as circuit-switched communications. Dispatch communication services are commonly known as a walkie-talkie or Push-To-Talk (PTT) type of call such as Sprint Nextel Corporation's service identified by the trade name Direct Connect. Interconnect voice communication services provided by most cellular carriers can be provided between sources and destinations of different cellular carriers. However, dispatch communication services are typically implemented in a proprietary manner which prevents dispatch calls from originating in one cellular carrier's network and terminating in another cellular carrier's network. Moreover, particular types of services provided in one dispatch communication network are not designed to work with dispatch stations from another dispatch communication network.

SUMMARY OF THE INVENTION

One service provided in dispatch communication networks is dispatch talk group calls, which are calls that can involve three or more dispatch stations. There are currently two different types of dispatch talk group calls, selective dynamic dispatch talk group calls and predefined dispatch talk group calls. Selective dynamic dispatch talk group calls require a user of a dispatch station to manually select each member of the dispatch talk group call prior to initiating the call. The dispatch talk group call request includes the identifiers for each dispatch station manually selected by the user of the dispatch station. Predefined dispatch talk group calls require that the dispatch stations that are members of the talk group call be predefined in the dispatch communication server, typically by the network operator. The network operator provides a single dispatch talk group identifier, which can be used to initiate the dispatch talk group call.

Because predefined dispatch talk group calls employ only a single identifier and rely upon the network infrastructure for providing the group membership (i.e., identifiers of the individual dispatch stations), predefined dispatch talk group calls are not easily implemented across two dispatch communication networks. Accordingly, the present invention provides systems and methods for predefined dispatch talk group calls between dispatch stations of two or more dispatch communication networks.

In accordance with exemplary embodiments of the present invention, predefined dispatch talk group calls are provided for dispatch stations supported by two or more dispatch communication networks. A network element in a second of the two dispatch communication networks includes a mapping of dispatch station identifiers between the two networks. When a predefined dispatch talk group call involving dispatch stations in the second dispatch communication network is received by a dispatch communication server in the first dispatch communication network, the dispatch communication server sends a call setup request to an application gateway using the dispatch station identifier assigned to the dispatch stations supported by the second dispatch communication network. The application gateway forwards the call setup request to an application server in the second network which obtains a translation of the dispatch station identifiers to determine which dispatch stations, supported by the second dispatch communication network, are members of the dispatch talk group. A dispatch communication server in the second dispatch communication network then sends the call setup request to dispatch stations in the second dispatch communication network that are members of the dispatch talk group call.

Other objects, advantages and novel features of the present invention will become apparent from the following detailed description of the invention when considered in conjunction with the accompanying drawings.

BRIEF DESCRIPTION OF THE DRAWING FIGURES

FIGS. 3a-3c illustrate exemplary predefined dispatch talk groups in accordance with the present invention;

DETAILED DESCRIPTION OF THE PREFERRED EMBODIMENTS

Figure 1:
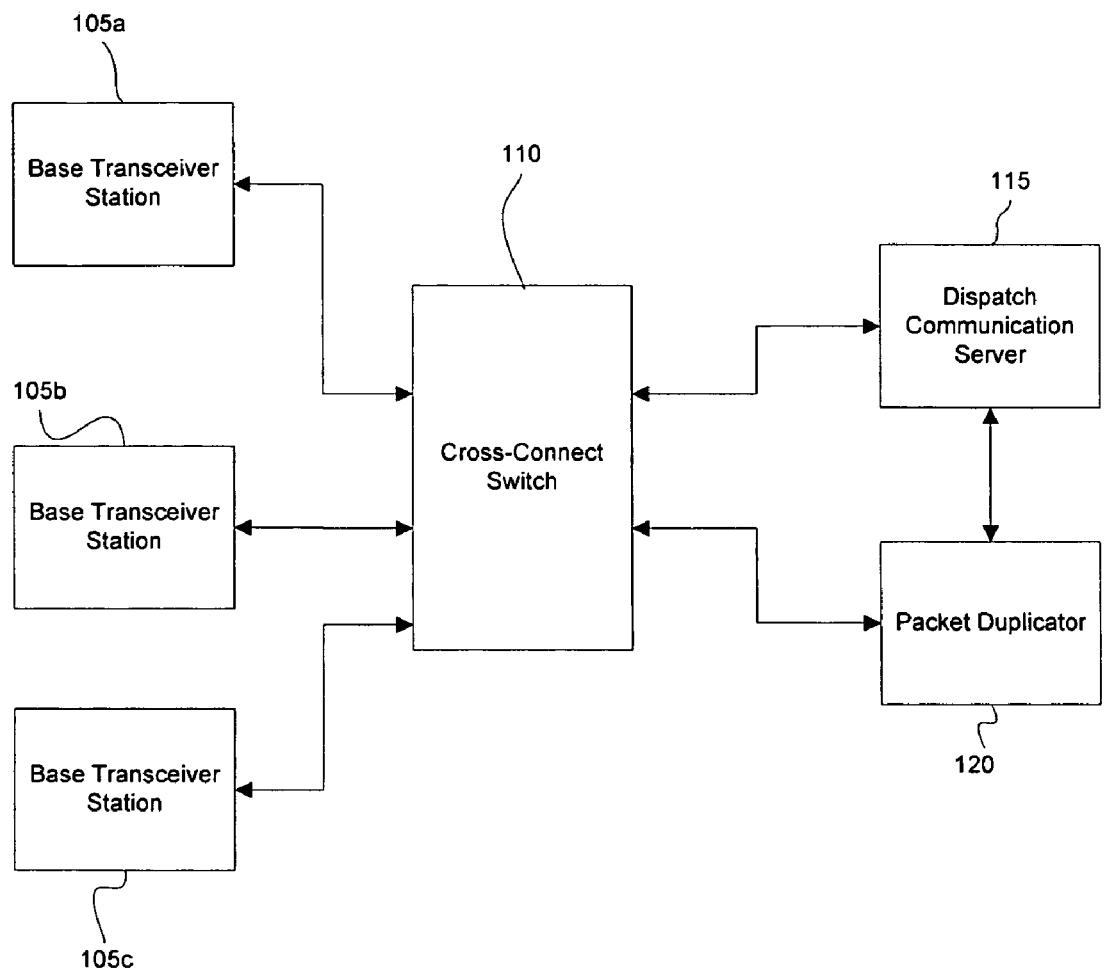
FIG. 1 illustrates a conventional dispatch communication network.

FIG. 1 illustrates a conventional dispatch communication network. The network includes one or more base transceiver stations 105a-105c coupled to a cross-connect switch 110. The cross-connect switch 110 is coupled to a dispatch communication server 115 and a packet duplicator 120, which are coupled to each other. When a first dispatch station supported by base transceiver station 105a performs a dispatch talk group call with a second dispatch station supported by base transceiver station 105b and a third dispatch station supported by base transceiver station 105c, the dispatch communication server 115 uses signaling to setup the dispatch communication with the second and third dispatch stations. The dispatch communication server 115 then identifies the group members and their locations to packet duplicator 120. Packet duplicator 120 generates a duplicate of each media packet for each base transceiver station that supports a dispatch station that is part of the dispatch talk group call, which in the present example includes base transceiver stations 105b and 105c. The packet duplicator provides the duplicate packets to cross-connect switch 110, which forwards the packets to the appropriate base transceiver stations.

Figure 2:
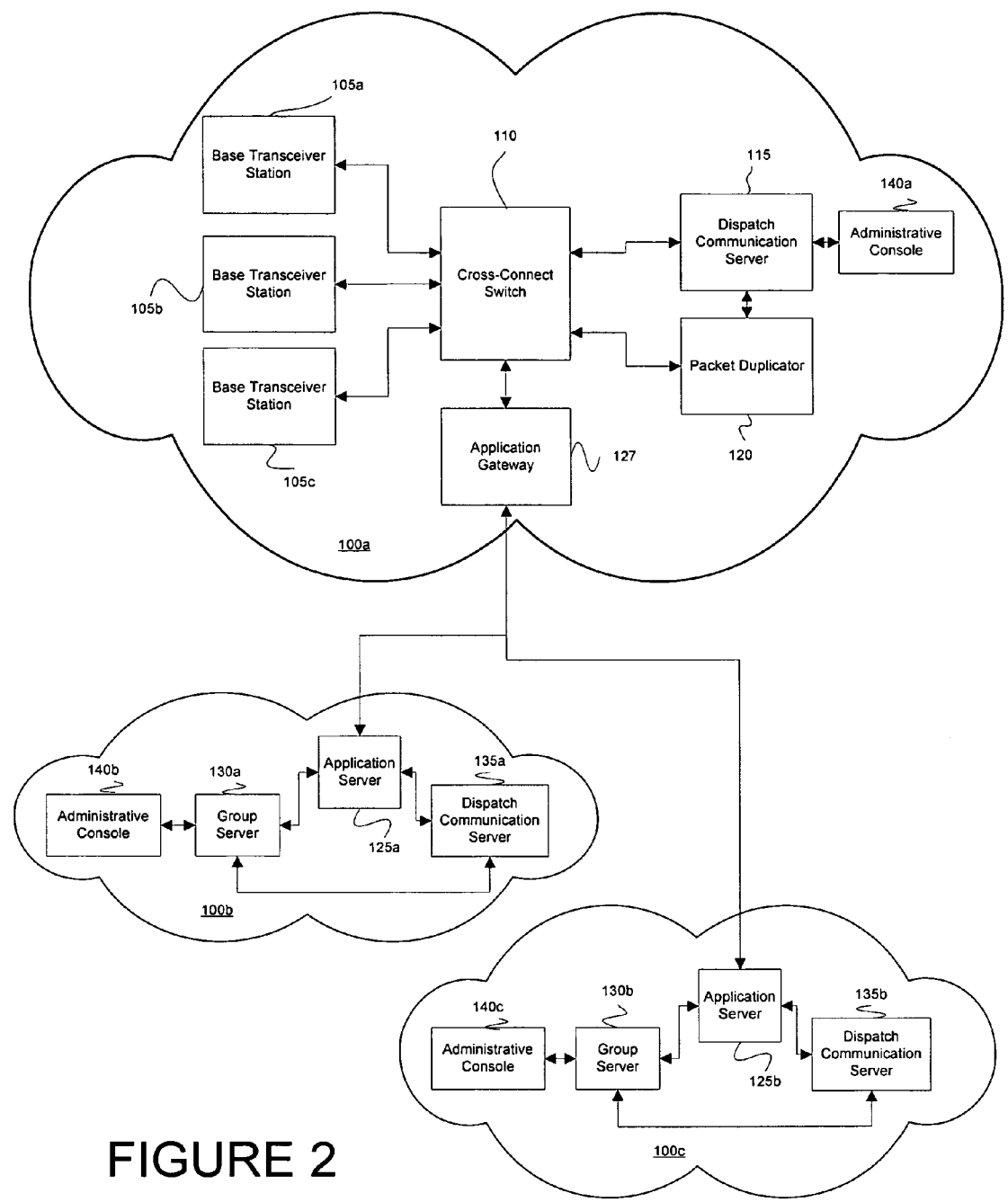
FIG. 2 illustrates an exemplary system with three dispatch communication networks in accordance with the present invention.

FIG. 2 illustrates an exemplary dispatch communication system that allows predefined dispatch talk group calls between dispatch stations of different dispatch communication networks. The different dispatch communication networks can be operated by different network operators or can be different regions of a system operated by a single network operator. The system of FIG. 2 includes three dispatch communication networks 100a-100c, where network 100a is similar to the network illustrated in FIG. 1. Application gateway 127 couples cross-connect switch 110 to application servers 125a and 125b. The application gateway 127 appears to the cross-connect switch 110 as another base transceiver station. The first network 100a can be an iDEN network and the second and third networks 10b and 100c can be any type of network supporting dispatch communications, including a Push-To-Talk over Cellular (PoC) network, a network that employs Qualcomm's QChat dispatch protocol, a data network (such as the Internet) that transparently passes dispatch communications between dispatch stations and the first dispatch communication network, and/or the like.

Application servers 125*a* and 125*b* of the second and third networks are coupled to a group server 130*a* or 130*b* and dispatch communication server 135*a* or 135*b*, and the group server is coupled to the dispatch communication server. The application servers 125*a* and 125*b* are responsible for coupling the second and third dispatch networks 100*b* and 100*c* with the first dispatch network 100*a* via application gateway 127. Dispatch communication servers 135*a* and 135*b* are responsible for setup and maintenance of dispatch calls, and operate in a similar manner to dispatch communication server 115. Group servers 130*a* and 130*b* are databases that store information related to the predefined dispatch talk groups. Although the group server and application server in the second and third networks are illustrated as separate network elements, they can be implemented as a single network element. Additionally, instead of including a separate group server in each of the second and third networks, a single group server can support both the second and third networks. The single group server can be located in one of the second or third networks, or can be external to both networks, e.g., a centralized group server.

In the dispatch communication system illustrated in FIG. 2, the first network 100*a* uses dispatch station identifiers that are formatted differently than those used in the second and third networks 100*b* and 100*c*. For example, the first dispatch communication network may use Urban Fleet Mobile Identifiers (UFMIs), International Mobile Station Identifiers (IMSIs), or mobile station identifiers (MSIDs), and the second and third networks may use Universal Resource Identifiers (URIs). Accordingly, predefined dispatch talk group calls involving dispatch stations of the two networks cannot be easily performed. The present invention provides systems and methods for predefined dispatch talk group calls between different dispatch communication networks.

Provisioning dispatch station and dispatch talk group identifiers can be performed using administrative consoles 140*a*-140*c*. Specifically, administrative console 140*a* can be used for provisioning dispatch communication server 115, administrative console 140*b* can be used for provisioning group server 130*a*, and administrative console 140*c* can be used for provisioning group server 130*b*. Instead of having an administrative console for each dispatch network, a single administrative console can be used for provisioning the group servers in more than one or all of the dispatch networks. Alternatively, or additionally, the dispatch station and dispatch talk group identifiers can be provisioned using an Internet portal or the like.

FIG. 3*a* illustrates a predefined dispatch talk group identifier and the associated dispatch station identifiers that are provisioned in dispatch communication server 115. Accordingly, when dispatch communication server 115 receives a dispatch talk group call request for Talk Group Identifier_1 the dispatch communication server 115 attempts to establish a dispatch talk group call with the dispatch stations represented by MSIDs 1-5. In accordance with exemplary embodiments of the present invention, at least one of the MSIDs represents at least one dispatch station located in the second or third network.

The present invention provides a number of different techniques for dispatch communication network 100*a* to identify dispatch stations located in dispatch communication networks 100*b* and 100*c*. In accordance with one aspect of the present invention, each dispatch station of the other network can be assigned a dispatch station identifier of the first network, which is represented in FIG. 3*a* as MSID_5. In accordance with a second aspect of the present invention, a single dispatch station identifier of the first network is used to represent all dispatch stations of the other networks that are members of the talk group. In accordance with a third aspect of the present invention, two dispatch station identifiers are used to represent all dispatch stations of each of the other networks that are members of the talk group, Accordingly, two dispatch station identifiers are employed per network. The use of the dispatch station identifiers of the first network for dispatch stations of the second or third network will be described in more detail below.

FIG. 3*b* illustrates information provisioned in dispatch communication server 135*a* or 135*b*. As illustrated in FIG. 3*b*, a dispatch talk group identifier of the second or third network is associated with a number of dispatch station identifiers of the second or third network. Each of the dispatch station identifiers includes a domain to indicate the particular network supporting the dispatch station (i.e., Network_1 and Network_2). FIG. 3*c* illustrates information provisioned in group server 130*a* or 130*b*. Alternatively or additionally, this information can be provisioned in application servers 125*a* or 125*b*. As illustrated in FIG. 3*c*, this information includes a mapping of dispatch station identifiers between the formats of the first and second or third networks. By providing the mapping of the dispatch communication network identifiers of the dispatch stations in the first dispatch communication network and the second or third dispatch communication networks, no modifications are required to the dispatch communication server 115 of the first dispatch communication network.

Figure 4:
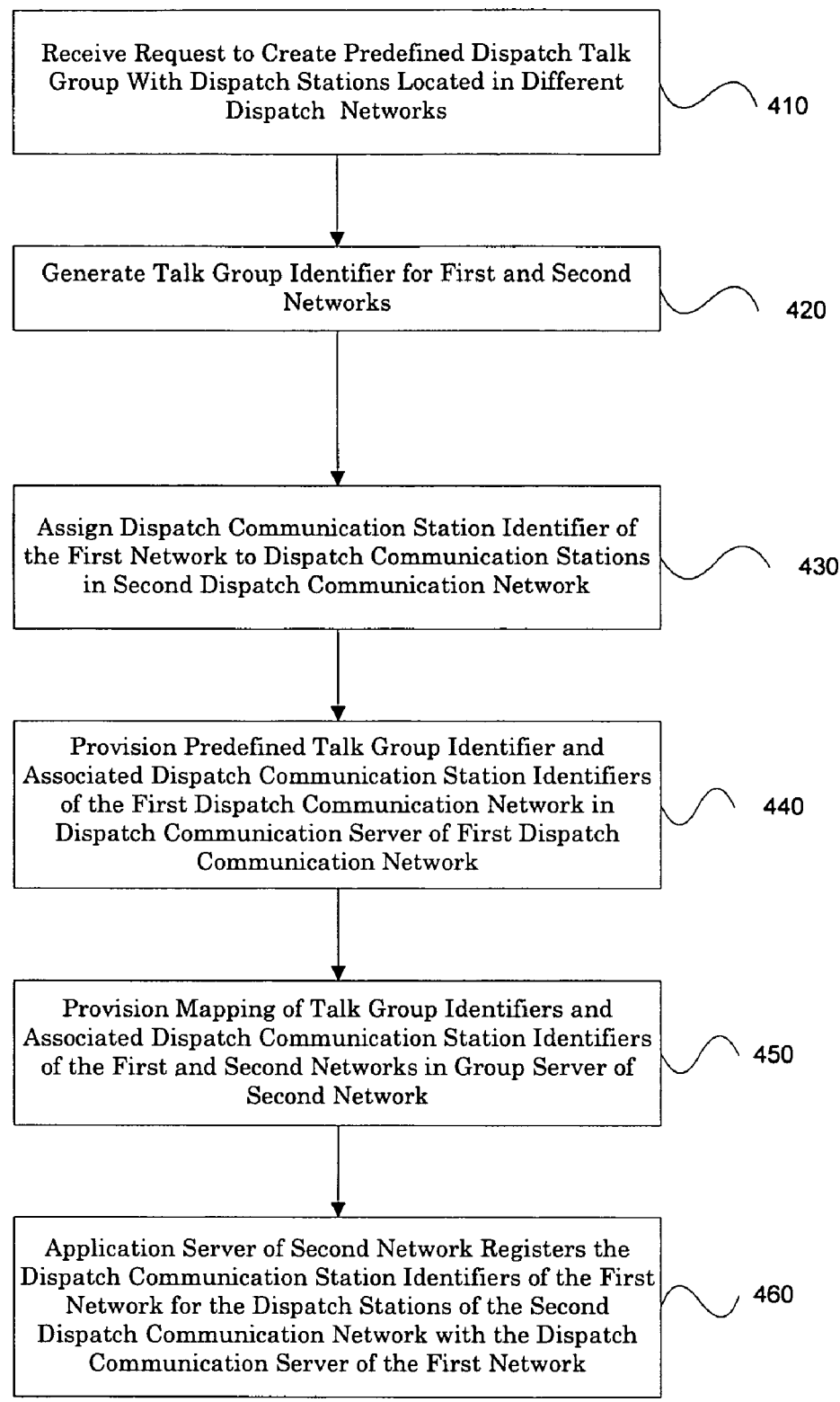
FIG. 4 illustrates an exemplary method for provisioning predefined dispatch talk groups in two dispatch communication networks.

FIG. 4 illustrates an exemplary method for generating and provisioning predefined dispatch talk groups in accordance with the present invention. When a network operator receives a request to create a predefined dispatch talk group with dispatch stations supported by different dispatch communication networks (step 410), the network operator generates a dispatch talk group identifier for the first and second networks (step 420). The network operator assigns one or more dispatch communication identifiers of the first network to dispatch stations in the second dispatch communication network (step 430). As discussed above, the network operator can assign a single dispatch station identifier for all of the dispatch stations in the second network that are members of the dispatch talk group, two dispatch station identifiers to all of the dispatch stations that are members of the talk group in the second network, or dispatch station identifiers to each of the dispatch stations located in the second dispatch communication network.

The network operator provisions the dispatch talk group identifier and the associated dispatch station identifiers of the first network in a dispatch communication server 115 in the first dispatch communication network (step 440). The network operator also provisions the mapping of the talk group identifiers and associated dispatch station identifiers of the first and second networks in group server 130*a* (step 450). The network operator can provision the dispatch talk group identifier of the second network and associated dispatch station identifiers of the second dispatch communication network in the application server 125*a*, or the group server can forward this information in the application server 125*a*. Moreover, any updates to the group membership, (i.e., new associated dispatch identifiers or dispatch identifiers to be deleted from being associated with the dispatch talk group identifier of the second network) are provided by the group server to the application server.

The application server 125*a* registers the dispatch station identifiers of the first network for the dispatch stations of the second dispatch communication network with the dispatch communication server 115 (step 460). The registration of step 470 can be performed automatically when the dispatch talk groups are provisioned in the second network, or the application server 125*a* can perform the registration when at least one dispatch station in the second network, which is a member of a talk group in the first network, registers for service in the second network. The registration can also be performed based on presence information. For example, the application server 125*a* can subscribe to presence information for the dispatch stations in the second network that are associated with the dispatch talk group identifier. Accordingly, when the presence information for at least one of the dispatch stations indicates that the dispatch station is available, the application server 125*a* can register with the dispatch communication server 115. When the presence information indicates that none of the dispatch stations are available, then the application server 125*a* will not register with the dispatch communication server 115, or deregister if previously registered.

Although FIG. 4 has been described with the provisioning of information being performed in a particular order, the information can be provisioned simultaneously or in any other order.

Figure 5:
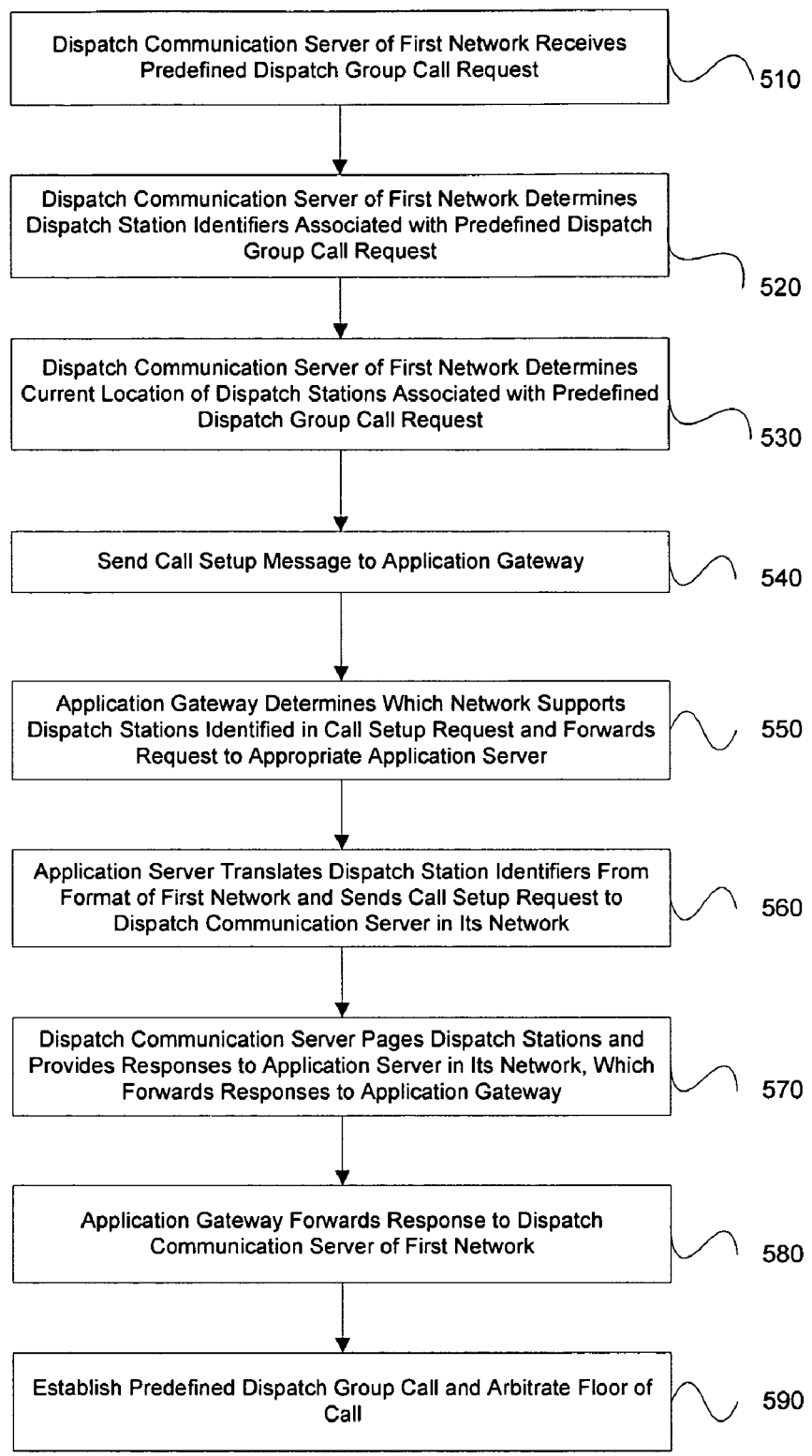
FIGS. 5 and 6 illustrate exemplary methods for establishing a predefined dispatch talk group call in accordance with the present invention.

FIG. 5 illustrates an exemplary method for establishing a predefined dispatch talk group call that originates in the first dispatch communication network in accordance with the present invention. When a predefined dispatch talk group call is initiated, the group call request is received by the dispatch communication server 115 in the first dispatch communication network (step 510). The dispatch communication server 115 determines dispatch station identifiers associated with the talk group identifier included in the group call request (step 520) and then determines the current location of dispatch stations associated with the group call request based on the previously received registration information (step 530).

Because the application gateway 127 appears to the dispatch communication server 115 as another base transceiver station, dispatch stations supported by the second or third dispatch communication networks will be identified as being located at the application gateway 127. Accordingly, the dispatch communication server 115 sends a call setup message to the application gateway 127 (step 540), where such message is similar to the call setup message sent to the base transceiver stations supporting dispatch stations in the first dispatch communication network. The application gateway 127 determines the network that is supporting the dispatch station based on the previously received registration information and forwards the call set-up request to the appropriate application server (step 550).

The application server, using information in its local cache or by consulting the group server, translates the dispatch station identifiers from a format of the first network into the appropriate format using the mapping illustrated in FIG. 3*c*, and then sends the dispatch call set-up request to the dispatch communication server in its network (step 560). The application server can also translate signaling and media between the first and second networks. Alternatively, if a separate translation network is available, the separate translation network can perform signaling and media translation between the first and second networks. The dispatch communication server then pages the appropriate dispatch stations and provides the responses to the call setup request to application server in its network, which forwards them to application gateway 127 (step 570). The application gateway 127 forwards the responses to dispatch communication server 115 (step 580). After receiving responses from one or more of the dispatch stations that are members of the predefined dispatch talk group, the dispatch communication server 115 then establishes the group call and arbitrates the floor of the call (step 590).

Figure 6:
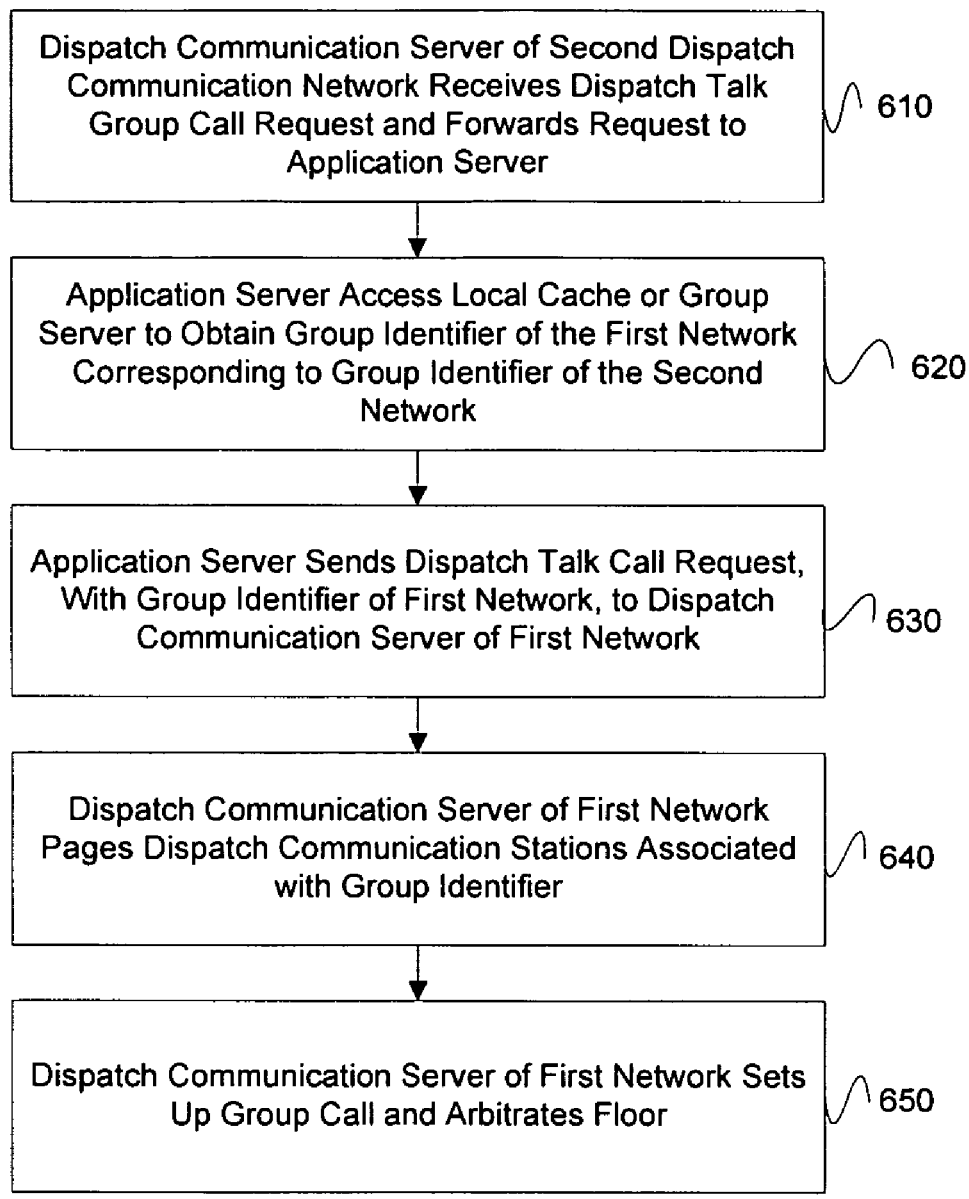

FIG. 6 illustrates an exemplary method for establishing a predefined group call that originates in the second dispatch communication network in accordance with the present invention. When a predefined dispatch talk group call is initiated in the second dispatch communication network, the predefined dispatch talk group call request is received by dispatch communication server 135*a*, which forwards the request to application server 125*a* (step 610). The request will include a dispatch talk group call identifier formatted in the manner used in the second network. Accordingly, application server 125*a* accesses its local cache or group server 180*a* to obtain the group identifier of the first network that corresponds to the group identifier of the second network (step 620). Application server 125*a* then sends the a dispatch talk group call request, including a group identifier of the first network, to dispatch communication server 115 of the first network (step 630). Dispatch communication server 115 pages dispatch stations associated with the group identifier (step 640).

When a single dispatch station identifier of the first network is used to represent all dispatch stations of the second network that are members of a dispatch talk group, the paging by the dispatch communication server of the first network will not result in a paging in the second network because the dispatch communication server 115 would recognize that the dispatch communication request came from a "dispatch station" associated with the dispatch communication identifier, and thereby does not require paging. Accordingly, for this scenario, the application server 125*a* or dispatch communication server 135*a* of network 100*b* will recognize the dispatch talk group request as it is routed toward the application gateway and initiate pages in the second network to any dispatch station other than that which initiated the dispatch call request, i.e., the dispatch communication server 135*a* will page all dispatch stations under its domain.

When two dispatch station identifiers are assigned to all dispatch stations in the second network that are members of a particular dispatch talk group, one of the dispatch station identifiers will be included in the request which is sent from the dispatch communication server of the second or third networks to its application server, which performs the appropriate address translation. The application server then forwards the request to application gateway 127, which provides the request to dispatch communication server 115. The dispatch communication server 115 will then page all of the dispatch stations of the second network that are members of the dispatch talk group using the second dispatch station identifier. Specifically, the page with the second dispatch station identification is received by an application server of the second or third network, which routes the page to the dispatch communication server of the second or third network. The dispatch communication server of the second or third network will then page the dispatch stations associated with the second dispatch station identification. The application servers of the second or third networks will manage page timeouts between the respective network and the first network.

When dispatch station identifiers of the first network are assigned to each of the dispatch stations in the second network, dispatch communication server 115 sends individual pages to the second network because each of these dispatch stations would be identified as being located at application gateway 127, which forwards the paged messages to the appropriate network. Dispatch communication server 115 then completes setting up the group call and arbitrates the floor during the group call (step 650). Accordingly, as long as the dispatch talk group includes at least one dispatch station in the first network, the dispatch communication servers of the second and third networks will delegate talker arbitration to the first network.

The methods for provisioning predefined dispatch talk groups and setting up dispatch talk group calls discussed above can be implemented in the different network entities as software (e.g., a computer-readable media) running on a processor, an application specific integrated circuit (ASIC), a field programmable gate array (FPGA), hard-wired logic, and/or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing predefined dispatch talk group communications between dispatch stations in a first and second network, the method comprising the acts of:
   generating a dispatch talk group identifier;
   assigning an identifier for dispatch stations supported by the second network;
   associating an identifier for a dispatch station supported by the first network and the identifier for dispatch stations supported by the second network with the dispatch talk group identifier; and
   provisioning the dispatch talk group identifier and associated identifiers in a dispatch communication server of the first network,
   wherein when a request for a predefined dispatch talk group call associated with the dispatch talk group identifier is received by the dispatch communication, the request is sent to an application gateway.

2. The method of claim 1, wherein the identifier for dispatch stations supported by the second network is associated with all dispatch stations supported by the second network that are members of a predefined dispatch talk group of the dispatch talk group identifier.

3. The method of claim 1, wherein the identifier for dispatch stations supported by the second network comprises an identifier for each of the dispatch stations supported by the second network that are members of a predefined dispatch talk group of the dispatch talk group identifier.

4. The method of claim 1, wherein the identifier for dispatch stations supported by the second network comprises two identifiers, which are associated with all dispatch stations supported by the second network that are members of a predefined dispatch talk group of the dispatch talk group identifier.

5. The method of claim 1, further comprising the act of:
   provisioning a second dispatch talk group identifier and second associated identifiers in a group server of the second network.

6. The method of claim 5, further comprising the act of:
   providing, by the group server to an application server, the second dispatch talk group identifier and second associated identifiers.

7. The method of claim 6, wherein when the group server receives an update of second associated identifiers, the method comprises the acts of:
   providing, by the group server to the application server, the updates of the second associated identifiers.

8. The method of claim 6, further comprising the act of:
   caching, by the application server, the second dispatch talk group identifier and second associated identifiers.

9. The method of claim 6, further comprising the act of:
   registering, by the application server, the identifier for the dispatch stations supported by the second network with the dispatch communication server of the first network.

10. The method of claim 9, wherein the application server performs the registration act when the group server provides the second dispatch talk group identifier and the second associated identifiers.

11. The method of claim 9, wherein the application server performs the registration act when at least one dispatch station associated with the second associated identifiers is available.

12. The method of claim 11, further comprising the act of:
    receiving, by the application server, presence information from a presence server indicating the availability of the at least one dispatch station.

13. The method of claim 5, wherein the dispatch talk group identifier and associated identifiers are of a first format and the second dispatch talk group identifier and associated dispatch identifiers are of a second format.

14. The method of claim 13, wherein the first format is an urban, fleet, mobile identifier (UFMI) format.

15. The method of claim 13, wherein the first format is a mobile station identifier (MSID) format.

16. The method of claim 13, wherein the second format is a universal resource indicator (URI) format.

17. The method of claim 13, wherein the second format is a mobile station identifier (MSID) format.

18. A method for providing predefined dispatch talk group communications between dispatch stations in a first and second network, the method comprising the acts of:
    generating a dispatch talk group identifier;
    assigning an identifier for dispatch stations supported by the second network;
    associating an identifier for a dispatch station supported by the first network and the identifier for dispatch stations supported by the second network with the dispatch talk group identifier;
    provisioning the dispatch talk group identifier and associated identifiers in a dispatch communication server of the first network;
    receiving, by the dispatch communication server of the first network, a request for a predefined dispatch talk group call, wherein the request includes the dispatch talk group identifier;
    determining identifiers associated with the dispatch talk group identifier; and
    sending the request for a dispatch talk group call to an application gateway, wherein the request includes the identifier assigned to dispatch stations supported in the second network.

19. The method of claim 18, wherein the application gateway forwards the request for a dispatch talk group call to an application server in the second network, the method further comprising the acts of:
    sending, by the application server, a request for a dispatch talk group call mapping to a group server;

receiving, by the application server, a response from the group server, wherein the response includes a second dispatch talk group identifier; and sending the response to a dispatch communication server in the second network.

20. The method of claim 19, further comprising the act of:

forwarding floor control requests from the dispatch communication server in the second network to the dispatch communication server in the first network.

21. A method for providing predefined dispatch talk group communications between dispatch stations in a first and second network, the method comprising the acts of:

generating a dispatch talk group identifier;

assigning an identifier for dispatch stations supported by the second network;

associating an identifier for a dispatch station supported by the first network and the identifier for dispatch stations supported by the second network with the dispatch talk group identifier;

provisioning the dispatch talk group identifier and associated identifiers in a dispatch communication server of the first network;

receiving, by an application server in the second network, a request for a dispatch talk group call, wherein the request includes the dispatch talk group identifier;

sending, by the application server, a request for a dispatch talk group call mapping to a group server;

receiving, by the application server, a response from the group server including the dispatch talk group identifier; and sending, by the application server, another request for a dispatch talk group call to the dispatch communication server in the first network, wherein the another request includes the dispatch talk group identifier.

22. The method of claim 21, wherein the identifier for dispatch stations supported by the second network is associated with all dispatch stations supported by the second network that are members of a predefined dispatch talk group of the dispatch talk group identifier, the method further comprising the acts of:

determining that the another request is being sent to the dispatch communication server in the first network; and paging all dispatch stations supported by the second network that are members of the predefined dispatch talk group of the dispatch talk group identifier except for a dispatch station that sent the request for the dispatch talk group call.

23. The method of claim 21, wherein the identifier for dispatch stations supported by the second network comprises two identifiers, the method comprising the acts of:

receiving, by the application server, a page request in response to the another request for a dispatch talk group call, wherein the page request includes a second of the two identifiers; and paging, by a dispatch communication server in the second network, the dispatch stations of the second network that are associated with the second of the two identifiers.

24. The method of claim 21, further comprising the acts of:

establishing a dispatch talk group call between dispatch stations supported by the first and second networks; and forwarding floor control requests from the dispatch stations supported by the second network to the dispatch communication server supported by the first network.

25. The method of claim 24, wherein the dispatch communication server supported by the first network arbitrates a floor of the dispatch talk group call between dispatch stations supported by the first and second networks.

26. The method of claim 24, further comprising the act of:

translating, by the application server in the second network, signaling and media of the dispatch talk group call.

27. The method of claim 24, further comprising the acts of:

transmitting, by the application server, signaling and media to a translation network; and translating, by the translation network, the signaling and media.

28. The method of claim 24, further comprising the acts of:

translating, by a translation network, signaling and media received from the first network; and receiving, by the application server from the translation network, the translated signaling and media.

* * * * *

UNITED STATES PATENT AND TRADEMARK OFFICE
CERTIFICATE OF CORRECTION

PATENT NO. : 7,636,581 B1  Page 1 of 1
APPLICATION NO. : 11/338627
DATED : December 22, 2009
INVENTOR(S) : Choksi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 971 days.

Signed and Sealed this

Ninth Day of November, 2010

David J. Kappos
*Director of the United States Patent and Trademark Office*